United States Patent
Noda et al.

(10) Patent No.: US 7,598,306 B2
(45) Date of Patent: *Oct. 6, 2009

(54) JOINING STRUCTURE FOR AN ACRYLIC RUBBER COMPOSITION AND HEAT-RESISTANT HOSE

(75) Inventors: Masashi Noda, Aichi-ken (JP); Shinobu Kanbe, Aichi-ken (JP); Hiroyoshi Mori, Aichi-ken (JP); Motohide Nishimura, Gifu-ken (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 595 days.

This patent is subject to a terminal disclaimer.

(21) Appl. No.: 11/424,709

(22) Filed: Jun. 16, 2006

(65) Prior Publication Data

US 2006/0280886 A1 Dec. 14, 2006

Related U.S. Application Data

(62) Division of application No. 10/489,264, filed as application No. PCT/JP02/09191 on Sep. 10, 2002, now Pat. No. 7,169,839.

(30) Foreign Application Priority Data

Sep. 14, 2001 (JP) ............................. 2001-279188

(51) Int. Cl.
  *C08K 5/17* (2006.01)
(52) U.S. Cl. ..................... 524/237; 428/36.8; 428/360
(58) Field of Classification Search ................ 428/36.8, 428/360; 524/237
  See application file for complete search history.

(56) References Cited

U.S. PATENT DOCUMENTS

| 4,419,493 | A | 12/1983 | Chang et al. |
| 6,526,859 | B1 | 3/2003 | Ozawa et al. |
| 7,169,839 | B2 * | 1/2007 | Noda et al. .................. 524/237 |

FOREIGN PATENT DOCUMENTS

| JP | 05-148476 A1 | 6/1993 |
| JP | 06-088005 A1 | 3/1994 |
| JP | 06-157826 A1 | 6/1994 |
| JP | 11-92614 A1 | 4/1999 |
| JP | 2000-213670 A1 | 8/2000 |
| JP | 2001-002877 A1 | 1/2001 |
| JP | 2001-98032 A1 | 4/2001 |
| JP | 2001-181464 A1 | 7/2001 |
| JP | 2001-240716 A1 | 9/2001 |
| JP | 2002-121352 A1 | 4/2002 |
| WO | WO 01/00725 | 1/2001 |

OTHER PUBLICATIONS

Patent Abstract for JP05-148476 published on Jun. 15, 1993.
Patent Abstract for JP06-088005 published on Mar. 29, 1994.
Patent Abstract for JP06-157826 published on Jun. 7, 1994.
Patent Abstract for JP11-92614 published on Apr. 6, 1999.
Patent Abstract for JP2000-213670 published on Aug. 2, 2000.
Patent Abstract for JP2001-002877 published on Jan. 9, 2001.
Patent Abstract for JP2001-98032 published on Apr. 10, 2001.
Patent Abstract for JP2001-181464 published on Jul. 3, 2001.
Patent Abstract for JP2001-240716 published on Sep. 4, 2001.
Patent Abstract for JP2002-121352 published on Apr. 23, 2002.

* cited by examiner

*Primary Examiner*—Edward J Cain
(74) *Attorney, Agent, or Firm*—Darby & Darby, P.C.

(57) ABSTRACT

An acrylic rubber composition in which the base material is an acrylic rubber comprising monomer units of ethyl acrylate, n-butyl acrylate, and cure site monomer, with a ratio (B/A) of the amount of n-butyl acrylate (B) with respect to ethyl acrylate (A) of 1.0 or less by weight. A heat-resistant hose having a layer of this acrylic rubber composition as the innermost layer. The above constitution of the invention provides the acrylic rubber composition effective for preventing aluminum fixing while retaining the material properties of acrylic rubber and its excellent characteristics. The present invention also provides a heat-resistant hose using this acrylic rubber composition at the surface which is to be fitted with an aluminum member.

14 Claims, No Drawings

# JOINING STRUCTURE FOR AN ACRYLIC RUBBER COMPOSITION AND HEAT-RESISTANT HOSE

This application is a continuation of U.S. patent application Ser. No. 10/489,264 filed Mar. 8, 2004 which is a U.S. National Phase Application under §371 of International Patent Application No. PCT/JP02/09191 filed Sep. 10, 2002, and claims the benefit of Japanese Patent Application No. 2001-279188 filed Sep. 14, 2001. The content of the applications are incorporated herein by reference, in their entirety.

TECHNICAL FIELD

The present invention relates to an acrylic rubber composition and a heat-resistant hose. More particularly, the present invention relates to an acrylic rubber composition with sufficient heat resistance, compression set resistance, oil resistance, and the like. When used as a heat-resistant hose, this acrylic rubber composition prevents fixing to a member made of aluminum. In addition, the acrylic rubber composition of the present invention can favorably extrude a large diameter hose. In addition, the present invention relates to a heat-resistant hose using the same.

BACKGROUND ART

In the prior art, rubber compositions having a base material of acrylic rubber are often used in hoses that require heat resistance, oil resistance, and cold resistance, such as in oil system hoses or air system hoses and the like for automobiles. In general, acrylic rubber has good heat resistance and oil resistance and also has good compression set resistance. As a result, when used in hoses, it has excellent sealing quality at the hose connection part.

When an acrylic rubber composition is used in a heat-resistant hose that is used under extreme conditions, such as in an air hose for a supercharger in a turbocharger assembly vehicle, if the connecting pipe is made of aluminum (or its alloy), the acrylic rubber composition often becomes fixed to the aluminum. The replacement operation of the heat-resistant hose has therefore been difficult (henceforth "aluminum fixing" refers to this fixing phenomenon).

The reason for the above aluminum fixing problem is thought to be the following. Aluminum is readily oxidized by the oxygen in the air to form alumina. Further, in the presence of water, alumina readily forms a hydroxide. This hydroxide and the rubber material react, which causes aluminum fixing.

In the prior art, in order to prevent aluminum fixing, in the invention described in Japanese Laid-Open Patent Publication Number 2001-2877 for example, an acryl-silicon copolymer is added to the acrylic rubber. In the invention described in Japanese Laid Open Patent Publication Number H6-88005, a phosphate ester plasticizer is added to the acrylic rubber, or a fatty acid processing aid or a metal soap compound is mixed into the acrylic rubber. Furthermore, in the invention described in Japanese Laid Open Patent Publication Number H5-148476, by adding a silicon processing aid, there is an effect of surface covering.

However, with the prior art described above, apart from their effectiveness in preventing aluminum fixing, the above strategies result in normal state physical properties which are inferior for acrylic rubber. In addition, there can be reduced heat resistance and compression set resistance which are characteristics of the acrylic rubber, or there may be bleeding of the mixing agents.

An object of the present invention is to provide an acrylic rubber composition which effectively prevents aluminum fixing while still retaining the physical properties and superior characteristics of acrylic rubber. A further object of the present invention is to provide a heat-resistant hose which uses this acrylic rubber composition in surfaces that join with aluminum or aluminum alloy members.

DISCLOSURE OF THE INVENTION

A first aspect of the invention is an acrylic rubber composition for use in a heat-resistant hose which joins with a member made of aluminum or aluminum alloy, said acrylic rubber composition being used in a layer which constitutes a joining surface with said member, comprising: acrylic rubber as a base material comprising monomer units of ethyl acrylate (A), n-butyl acrylate (B), and a cure site monomer; and a ratio (B/A) of the amount of n-butyl acrylate with respect to ethyl acrylate of 1.0 or less.

With the acrylic rubber composition of the first aspect of the invention, because the base material of acrylic rubber contains monomer units of ethyl acrylate, n-butyl acrylate, and cure site monomers, and particularly because it contains n-butyl acrylate, the excellent characteristics of acrylic rubber of heat resistance, oil resistance, compression set resistance, and the like are retained.

Ethyl acrylate, which has a smaller electron donating property (polarization of charge within the molecule) than n-butyl acrylate, has a smaller reactivity with aluminum hydroxide, and aluminum fixing is less likely to occur. With the acrylic rubber used in the acrylic rubber composition of invention 1, B/A is 1.0 or less, or in other words, there is an equal or greater amount of ethyl acrylate as compared with the amount of n-butyl acrylate. As a result, aluminum fixing is effectively suppressed.

In addition, with the acrylic rubber composition of the first aspect of the invention, because silicon mixing agents, or phosphate ester plasticizers, fatty acid processing aids, metal soap compounds and the like are not mixed in as in the prior art, the problems of their bleeding do not occur. In addition, the excellent properties of acrylic rubber of heat resistance, oil resistance, compression set resistance, and the like are retained.

A second aspect of the present invention is an acrylic rubber composition relating to the first aspect of the invention, wherein: the ratio of amount B/A is 0.1-1.0.

When the ratio (B/A) of the amount of n-butyl acrylate (B) with respect to ethyl acrylate (A) is within the range of 0.1-1.0, the effect of the first aspect of the invention is particularly apparent.

When B/A exceeds 1.0, because there is excess n-butyl acrylate in the monomer composition of the acrylic rubber, aluminum fixing of the acrylic rubber composition occurs more readily. When B/A is less than 0.1, because there is an insufficient absolute amount of n-butyl acrylate in the monomer composition of acrylic rubber, the excellent properties of acrylic rubber of heat resistance, oil resistance, compression set resistance, and the like may be compromised.

A third aspect of the present invention is an acrylic rubber composition, relating to the first and second aspects of the invention, wherein: the amount of cure site monomer in the acrylic rubber is 0.5-2% by weight.

The amount of cure site monomer in the acrylic rubber which is the base material of the acrylic rubber composition is not restricted, but it is preferably 0.5-2% by weight in the acrylic rubber.`

When the amount of cure site monomer is less than 0.5% by weight, there may be inadequate vulcanization of the acrylic rubber, and the sticking property increases. In addition, there is the risk of heat fixing of the rubber composition to aluminum. On the other hand, because cure site monomers have a larger electron donating property compared to ethyl acrylate and n-butyl acrylate, when the amount exceeds 2% by weight, after vulcanization, the excess cure group may result in aluminum fixing of the acrylic rubber composition.

A fourth aspect of the present invention is a heat-resistant hose, being a heat-resistant hose which joins with a member made of aluminum or aluminum alloy, wherein: an acrylic rubber composition of one of the first to third aspects of the invention is used in a layer which constitutes a joining surface with the member.

With the heat-resistant hose of the fourth aspect of the invention, because an acrylic rubber composition of the first to third aspects of the invention is used in a layer which constitutes the joining surface with an aluminum or aluminum alloy member, aluminum fixing of the heat-resistant hose is effectively prevented. At the same time, the heat resistance, oil resistance, compression set resistance, and the like of the hose is maintained.

A fifth aspect of the present invention is a heat-resistant hose relating to the heat-resistant hose of the fourth aspect of the invention, wherein: the heat-resistant hose is used as a high heat-resistant hose in an air system or oil system of an automobile.

Although the purpose of the heat-resistant hose of the fourth aspect of the invention is not restricted, from the actions and advantages of the fourth aspect of the invention, this is ideally suited for use in high heat-resistant hose of air systems or oil systems of automobiles.

BEST MODES OF CARRYING OUT THE INVENTION

[Acrylic Rubber Composition]

The acrylic rubber composition of the present invention is a rubber composition used in a heat-resistant hose which joins with a member made of aluminum or aluminum alloy and is used in a layer which constitutes a joining surface with this member.

The type of aluminum or aluminum alloy member is not limited, but a representative example is a hose connecting pipe for use in turbochargers in automobiles. Other examples also include intercooler and intake manifold, and the like.

The acrylic rubber used as the base material for the acrylic rubber composition is one which is copolymerized by any of the known methods, such as emulsion polymerization, suspension polymerization, solution polymerization, bulk polymerization, and the like. The monomer components for the acrylic rubber include at least ethyl acrylate, n-butyl acrylate, and cure site monomer. The ratio B/A of the amount of n-butyl acrylate (B) to the amount of ethyl acrylate (A) is 1.0 or less, preferably in the range of 0.1-1.0.

The acrylic rubber which is the base material for the acrylic rubber composition can also include suitable monomer components other than those described above. Examples of suitable monomer components include compounds containing a carboxyl group such as acrylic acid, methacrylic acid, crotonic acid, 2-pentenoic acid, maleic acid, fumaric acid, itaconic acid, and the like.

Other examples of monomer components include acrylic esters containing fluorine, such as 1,1-dihydroperfluoroethyl (meta)acrylate, 1,1-dihydroperfluoropropyl (meta)acrylate, 1.1,5-trihydroperfluorohexyl(meta)acrylate, 1,1,2,2-tetrahydroperfluoropropyl(meta)acrylate, 1,1,7-trihydroperfluoroheptyl(meta)acrylate, 1,1-dihydroperfluorooctyl(meta)acrylate, 1,1-dihydroperfluorodecyl(meta)acrylate, and the like.

Other examples include acrylic esters containing a hydroxyl group, such as 1-hydroxypropyl(meta)acrylate, 2-hydroxypropyl(meta)acrylate, hydroxyethyl(meta)acrylate, and the like.

Other examples also include acrylic esters containing a tertiary amino group such as diethylaminoethyl(meta)acrylate, dibutylaminoethyl(meta)acrylate, and the like; methacrylates such as methyl methacrylate, octyl methacrylate, and the like; alkylvinyl ketones such as methylvinyl ketone, and the like; vinyl and allyl ethers such as vinylethyl ether, allylmethyl ether, and the like; vinyl aromatic compounds such as styrene, alpha-methylstyrene, chlorostyrene, vinyltoluene, and the like; vinyl nitriles such as acrylonitrile, methacrylonitrile, and the like. Other examples also include ethylene, propylene, vinyl chloride, vinylidene chloride, vinyl fluoride, vinylidene fluoride, vinyl acetate, vinyl propionate, alkyl fumarate, and the like.

The type of cure site monomer is not limited. They can be selected for example from cure site monomers containing carboxyl group, cure site monomers containing epoxy group, cure site monomers containing activated chlorine group, and the like. Examples of the aforementioned cure site monomer containing carboxyl group include monoalkyl ester maleate, monoalkyl ester fumarate, monoalkylester itaconate, and the like. The amount of cure site monomer in the acrylic rubber is not limited, but preferably it is 0.5-2% by weight.

In the acrylic rubber composition of the present invention, as long as the effect of the invention is not inhibited, other suitable mixing components can be added as needed. These mixing components include a vulcanizing agent, carbon black, antioxidant, plasticizer, processing aid, scorch retarder, flame retardant, coloring agent, and the like.

The type or amount of the aforementioned vulcanizing agent is not limited, but in an acrylic rubber that contains carboxyl group, a vulcanizing agent, comprising a diamine compound, non-chelating guanidine compound and metal chelated guanidine compound, is mixed at 4.3-8.1 parts by weight with respect to 100 parts by weight of acrylic rubber.

For the aforementioned carbon black, it preferably has an average grain size of 30-60 nm with a DBP oil absorption amount of 150 cc/100 g or greater. The mixing amount is preferably around 50-80 parts by weight with respect to 100 parts by weight of acrylic rubber.

[Heat-Resistant Hose]

The heat-resistant hose of the present invention is connected to an aluminum or aluminum alloy member. The heat-resistant hose of the present invention uses one of the aforementioned acrylic rubber compositions in a layer which constitutes a joining surface with this member.

The usage of the heat-resistant hose is not limited, but preferably, it is used in high heat-resistant hose in air systems or oil systems of automobiles. An example of a high heat-resistant hose of an air system includes a hose for use in a supercharger and the like. Examples of high heat-resistant hoses for an oil system include engine oil cooler hose, AT (automatic transmission) oil cooler hose, power steering hose, and the like.

The constitution of the rubber hose can be, for example, a single layer hose having a single rubber layer of the aforementioned acrylic rubber composition. Depending on the purpose of the hose, it can be a multi-layer hose, having in addition to the rubber layer of the aforementioned acrylic rubber composition, a middle layer or outer layer of a rubber layer which uses acrylic rubber or a rubber other than acrylic rubber (for example, fluororubber, fluorine modified rubber, hydrine rubber, CSM, CR, NBR, ethylene-propylene rubber, and the like). In addition, a reinforcement layer using reinforcement fibers or wires can be provided in the middle layer or outermost layer. In either case, with multi-layer hoses, the aforementioned acrylic rubber composition layer constitutes the innermost layer of the hose.

EMBODIMENT

[Preparation of Acrylic Rubber Non-Vulcanized Composition]

Acrylic rubber compositions of Examples 1-6 and Comparative examples 1-4 shown in Tables 1, 2, and 3 were prepared.

With regard to the acrylic rubber compositions of each example, in the row labeled "Acrylic polymer" in Tables 1 and 2, the monomer composition of the acrylic rubber including the type and amount of cure site monomer is shown. The row labeled "Ethyl acrylate/n-butyl acrylate" shows the mixing ratio of ethyl acrylate and n-butyl acrylate.

In addition, in Table 3, the basic mixture for the acrylic rubber compositions of the examples are shown. The numerical values of Table 3 have units of phr (parts per hundred parts of rubber). The names of the products that were actually used as the mixture components in Tables 1-3 are listed in Table 4.

Non-vulcanized acrylic rubber having the monomer compositions of Examples 1-6 and Comparative examples 1-4 were prepared. All of the ingredients except for the vulcanizing agent were kneaded with a 1.7 L banbury mixer. Furthermore, in an 8 inch roll, the vulcanizing agent was added, and the acrylic rubber non-vulcanized composition for each of the examples were prepared.

[Evaluation of the Acrylic Rubber Non-Vulcanized Composition]

(Normal State Physical Properties)

Using the acrylic rubber non-vulcanized composition for each example, a non-vulcanized rubber sheet of thickness 2 mm was made with an 8 inch mixing roll. After press vulcanization at 160 degrees C.×60 minutes, this was oven vulcanized at 150 degrees C.×8 hours. A rubber test sheet for evaluating normal state physical properties was obtained. For each of the rubber test pieces, the tensile strength (MPa), elongation at break (%), and tear strength (B method, N/mm) were evaluated according to JIS K 6251. The evaluation results are shown in the row "Normal State Physical Properties" in Tables 1 and 2.

(Heat Resistance)

Using the acrylic rubber non-vulcanized composition for each example, rubber test sheets were made in the same manner as described above for use in heat resistance evaluation. After heat aging at 200 degrees C.×168 hours, the tensile strength (MPa), elongation at break (%), and tear strength (B method, N/mm) were evaluated according to JIS K 6257. In addition, a JIS number 5 dumbbell after heat aging was bent 180°, and the appearance was evaluated for cracks or breakages and the like. The evaluation results are shown in the row labeled "Heat resistance" in Tables 1 and 2. With regard to the bending test, examples in which there was no damage was evaluated as "OK" and if there was damage, this was described in concrete terms.

(Compression Set Resistance)

Using the acrylic rubber non-vulcanized composition for each example, a large test piece was created by press vulcanizing at 160 degrees C.×60 minutes and oven vulcanizing at 150 degrees C.×8 hours according to JIS K 6262. The compression set resistance (%) after heat aging at 200 degrees C.×22 hours was evaluated according to JIS K 6262. The evaluation results are shown in the row labeled "Compression set resistance" in Tables 1 and 2.

(Low Temperature Properties)

Using the acrylic rubber non-vulcanized composition for each example, rubber test sheets for evaluation of low temperature properties were created by the same method as in the aforementioned "Normal State Properties" section. The low temperature properties for these test pieces were evaluated by the brittle point temperature (degrees C.) according to JIS K 6301. The evaluation results are shown in the row labeled "Low temperature properties" in Tables 1 and 2.

(Oil Resistance)

Using the acrylic rubber non-vulcanized composition for each example, rubber test sheets for evaluation of oil resistance were created by the same method as in the aforementioned "Normal State Properties" section. These test pieces were immersed in IRM 903 oil at 150 degrees C. for 72 hours. Afterwards, the oil resistance was evaluated by measuring the volume change (%). The evaluation results are shown in the row labeled "Oil resistance" in Tables 1 and 2.

(Fixing Property)

Using the acrylic rubber non-vulcanized composition for each example, a large size test piece (diameter 29 mm, thickness 12.5 mm) was created by press vulcanizing at 160 degrees C.×60 minutes and oven vulcanizing at 150 degrees C.×8 hours according to JIS K6262 item 5. For the material for use in the fixing evaluation (fixing evaluation material), sheets of thickness 2 mm with a surface area somewhat larger than the test pieces were prepared using aluminum material, iron material, and Teflon material.

Next, the aforementioned test pieces were sandwiched between two sheets of the aforementioned fixing evaluation materials. This was attached to a testing equipment according to JIS K6262 item 5. This was compressed at a constant compression rate of 25%, and this was treated under the heat aging condition of 200 degrees C.×168 hours. After heat aging, the test piece was removed from the testing equipment while still sandwiched between the fixing evaluation materials. The fixing evaluation materials were removed from the test piece, and the fixing status of both of their surfaces was observed. The results are shown in the row "Metal fixing property" in Tables 1 and 2 and are divided into "Aluminum", "Iron", and "Teflon". If even one portion of the rubber material of the test piece was attached to the fixing evaluation material due to fixing, this is indicated as "X", if there was none attached, it is indicated as "O".

[Performance Evaluation of the Heat-Resistant Hose]

[Making the Heat-Resistant Hose]

Using the acrylic rubber non-vulcanized composition for each example, a heat-resistant hose having an inner surface rubber layer of thickness 3 mm and an outer surface rubber layer of thickness 2 mm and a middle reinforcement layer was made. For these heat-resistant hoses, the inner surface rubber layers were constituted using the acrylic rubber non-vulcanized composition of each example. The reinforcement layer was constituted by braiding with a piece x carrier of 1×32 fibers at a braiding angle of 55 degrees using para-type aromatic polyamide reinforcement fibers. The same material for the inner surface rubber layer was used for the outer surface rubber layer in each example.

(Evaluation of the Joint After Aging of the Heat-Resistant Hose)

The heat-resistant hoses created using the acrylic rubber non-vulcanized compositions for each example as described above were attached to aluminum cast pipes having a straight diameter of 31 mm and bulging shape according to JASO M101. These were tightened with a tightening torque of 3 N·m by a warm gear clamp according to JASO F207.

After heat aging the attached heat-resistant hose at 200 degrees C.×168 hours, the warm gear clamp was removed and the pipe was removed. Any remnants of rubber on the pipe surface was observed. In addition, after this observation, the same heat-resistant hose was again attached to the pipe, and the air inside the hose joint interior was pressurized to 200 kPa, and the presence or absence of leakage was confirmed. In the row labeled "Joint after aging" of Tables 1 and 2, the visual observation results of any remnants of rubber are indicated in the "Pipe removal" row, and the presence or absence of leakage is shown in the "Reassembly leak test".

(Evaluation of Cold Resistance of the Heat-Resistant Hose)

A heat-resistant hose of each example having a length 25 mm was left for 5 hours in a −35 degrees C. environment. Immediately after removing from this environment, the heat-resistant hose was sandwiched between two flat plates and was rapidly compressed by these plates so that the inner diameter of the hose was halved. Any cracks in the heat-resistant hose was confirmed. The results are shown in the "Cold resistance" row of Table 1 and 2.

(Compression Breaking Test of the Heat-Resistant Hose)

A heat-resistant hose of each example having a length 25 mm was heat aged at 200 degrees C.×168 hours. Immediately afterwards, the heat-resistant hose was sandwiched between two flat plates and was rapidly compressed by these plates so that the inner diameter of the hose was halved. Any cracks in the heat-resistant hose was observed. The results are shown in the row labeled "Compression break" in Tables 1 and 2.

Field of Use in Industry

As described above, according to the present invention, an acrylic rubber composition which maintains sufficient heat resistance, compression set resistance, oil resistance and the like while preventing fixing to aluminum members during use as a heat-resistant hose is provided. Furthermore, this acrylic rubber composition can favorably extrude a large diameter hose. Therefore, a good heat-resistant hose can be made using this acrylic rubber composition.

TABLE 1

| | | | Ex. 1 | Ex. 2 | Ex. 3 | Ex. 4 | Ex. 5 | Ex. 6 |
|---|---|---|---|---|---|---|---|---|
| Acrylic polymer (wt %) | Composition | Ethylene | — | — | — | — | 10 | — |
| | | Ethyl acrylate | 99 | 89.1 | 74.3 | 49.5 | 66.8 | 74.3 |
| | | n-Butyl acrylate | 0 | 9.9 | 24.7 | 49.5 | 22.2 | 24.7 |
| | | Ethyl acrylate/n-butyl acrylate | 100/0 | 90/10 | 75/25 | 50/50 | 75/25 | 75/25 |
| | Cure site monomer (wt %) | Monoethyl ester fumarate | 1 | 1 | 1 | 1 | 1 | — |
| | | Glycidyl methacrylate | — | — | — | — | — | 1 |
| Normal state physical properties | | tensile strength (MPa) | 12.2 | 12.0 | 11.4 | 11.2 | 12.6 | 11.6 |
| | | Elongation (%) | 250 | 240 | 230 | 230 | 250 | 220 |
| | | Tearing (B method, N/mm) | 27.2 | 26.8 | 26.0 | 24.1 | 31.6 | 25.8 |
| Heat resistance after 200° C. × 168 h | | Tensile strength (MPa) | 9.8 | 9.8 | 9.6 | 9.5 | 11.1 | 9.8 |
| | | Elongation (%) | 120 | 120 | 110 | 100 | 120 | 110 |
| | | Bending test | OK | OK | OK | OK | OK | OK |
| | | Tearing (B method, N/mm) | 16.1 | 16.1 | 15.6 | 14.4 | 19.2 | 15.5 |
| Compression set (%) | | 200° C. × 22 h | 25 | 25 | 24 | 26 | 25 | 51 |
| Low temperature properties | | Brittle point temperature (° C.) | −18 | −23 | −29 | −33 | −34 | −30 |
| Oil resistance-IRM 903, after 150° C. × 72 hours | | Volume change (%) | 12 | 14 | 19 | 24 | 25 | 18 |
| Metal fixing - Aluminum, after 200° C. × 168 hours | | Visual observation | ○ | ○ | ○ | ○ | ○ | ○ |
| Iron, after 200° C. × 168 hours | | Visual observation | ○ | ○ | ○ | ○ | ○ | ○ |
| Teflon, after 200° C. × 168 hours | | Visual observation | ○ | ○ | ○ | ○ | ○ | ○ |
| Product performance | Joint after aging | pipe removed after heat aging at 200° C. × 168 hours | no damage | no damage | no damage | no damage | no damage | no damage |
| | | Reassembly leak test | no damage | no damage | no damage | no damage | no damage | no damage |
| | Cold resistance | after cooling at −35° C. × 5 hrs, compression to ½ inner diameter | breakage | no damage | no damage | no damage | no damage | no damage |
| | Compression break | after heat aging at 200° C. × 168 h, compression to ½ inner diameter | no damage | no damage | no damage | no damage | no damage | no damage |

TABLE 2

|  |  |  | Comp Ex. 1 | Comp. Ex. 2 | Comp. Ex. 3 | Comp. ex. 4 |
|---|---|---|---|---|---|---|
| Acrylic polymer | Composition (wt %) | Ethylene | — | — | — | — |
|  |  | Ethyl acrylate | 24.7 | 0 | 74.8 | 72.8 |
|  |  | n-Butyl acrylate | 74.3 | 99 | 24.9 | 24.2 |
|  |  | Ethyl acrylate/n-Butyl acrylate | 25/75 | 0/100 | 75/25 | 75/25 |
|  | Cure site monomer (wt %) | Monoethyl ester fumarate | 1 | 1 | 0.3 | 3 |
|  |  | Glycidyl methacrylate | — | — | — | — |
| Normal state physical properties |  | tensile strength (MPa) | 11.0 | 10.9 | 7.9 | 13.0 |
|  |  | Elongation (%) | 220 | 200 | 360 | 180 |
|  |  | Tearing (B method, N/mm) | 21.9 | 19.6 | 27.3 | 19.3 |
| Heat resistance after 200° C. × 168 h |  | Tensile strength (MPa) | 9.5 | 9.2 | 4.1 | 11.3 |
|  |  | Elongation (%) | 80 | 60 | 120 | 70 |
|  |  | Bending test | OK | Cracks | OK | Cracks |
|  |  | Tearing (B method, N/mm) | 13.2 | 11.9 | 14.3 | 6.9 |
| Compression set (%) |  | 200° C. × 22 h | 25 | 26 | 79 | 22 |
| Low temperature properties |  | Brittle point temperature (° C.) | −36 | −42 | −30 | −28 |
| Oil resistance-IRM 903, after 150° C. × 72 hours |  | Volume change (%) | 32 | 43 | 63 | 17 |
| Metal fixing - Aluminum, after 200° C. × 168 hours |  | Visual observation | X | X | X | X |
| Iron, after 200° C. × 168 hours |  | Visual observation | ○ | ○ | ○ | ○ |
| Teflon, after 200° C. × 168 hours |  | Visual observation | ○ | ○ | ○ | ○ |
| Product performance | Joint after aging | pipe removed after heat aging at 200° C. × 168 hours | rubber remains | rubber remains | rubber remains | rubber remains |
|  |  | Reassembly leak test | leakage | leakage | leakage | leakage |
|  | Cold resistance | after cooling at −35° C. × 5 hrs, compression to ½ inner diameter | no damage | no damage | no damage | no damage |
|  | Compression break | after heat aging at 200° C. × 168 h, compression to ½ inner diameter | no damage | breakage | no damage | breakage |

TABLE 3

| | Number of parts for mixing (phr) | |
|---|---|---|
| Ingredients | Ex. 1-5, Comp. Ex. 1-4 | Ex. 6 |
| Acrylic polymer *1 | 100 | 100 |
| Stearic acid | 2 | 2 |
| Anti-oxidant | 2 | 2 |
| FEF Carbon black | 55 | 55 |
| Plasticizer | 5 | 5 |
| Diamine compound | 0.5 | — |
| Guanidine compound | 2 | — |
| Imidazole compound | — | 1 |
| Thiourea compound | — | 0.5 |
| Quatenary ammonium salt | — | 0.3 |

TABLE 4

(Product names)

Stearic acid: Runac S30 (Kao Corp.)
Antioxidant: Naugard 445 (Uniroyal Chemical Company Inc.)
FEF Carbon black: Seast SO(Tokai Carbon Co. Ltd.)
Plasticizer: Adeka RS-735 (Asahi Denka Co. Ltd.)
Diamine compound: Diak #1 (Dupont Dow Elastomers LLC)
Guanidine compound: Nocceler DT (Ouchi Shinko Chemical Industrial Co. Ltd.)
Imidazole compound: SN-25 (Shikoku Chemicals)
Thiourea compound: Nocceler TMU (Ouchi Shinko Chemical Industrial Co. Ltd)
Quatenary ammonium salt: Katinal STB (Toho Chemical Industry Co. Ltd.)

What is claimed is:

1. A joining structure comprising:
   a heat-resistant hose;
   a member made of aluminum or aluminum alloy; and
   an acrylic rubber composition, comprising:
   monomer units of ethyl acrylate (A), n-butyl acrylate (B), and cure site monomer; and
   a ratio (B/A) of the amount of n-butyl acrylate (B) with respect to ethyl acrylate (A) is 1.0 or less,
   wherein said acrylic rubber composition acts as a joining surface to join said member to said heat-resistant hose.

2. The joining structure according to claim 1, wherein:
   said ratio B/A is from 0.1 to 1.0.

3. The joining structure according to claim 1, wherein:
   said member made of aluminum or aluminum alloy is a hose connecting pipe, an intercooler, or an intake manifold used in a turbocharger of an automobile.

4. The joining structure according to claim 1, wherein:
   said acrylic rubber composition copolymerizes monomer units by emulsion polymerization, suspension polymerization, solution polymerization, or bulk polymerization.

5. The joining structure according to claim 1, wherein:
   said acrylic rubber composition contains additional monomer units of at least one selected from the group consisting of a compound containing carboxyl group, ester acrylate containing fluorine, ester acrylate containing hydroxyl group, ester acrylate containing tertiary amino group, methacrylate, alkyl vinylketone, vinyl ether, allyl ether, vinyl aromatic compound, vinyl nitrile, ethylene, propylene, vinyl chloride, vinylidene chloride, vinyl fluoride, vinylidene fluoride, vinyl acetate, vinyl propionate, and alkyl fumarate.

6. The joining structure according to claim 1, wherein:
said cure site monomer is a cure site monomer containing carboxyl group, a cure site monomer containing epoxy group, or a cure site monomer containing activated chlorine group.

7. The joining structure according to claim 6, wherein:
said cure site monomer containing carboxyl group is monoalkyl ester maleate, monoalkyl ester fumarate, or monoalkyl ester itaconate.

8. The joining structure according to claim 1, wherein:
the amount of said cure site monomer in said acrylic rubber is 0.5-2% by weight.

9. The joining structure according to claim 1, wherein:
at least one selected from the group consisting of a vulcanizing agent, carbon black, anti-oxidant, plasticizer, processing aid, scorch retardant, flame retardant, and coloring agent are mixed into said acrylic rubber composition.

10. The joining structure according to claim 1, wherein:
said heat-resistant hose is a single layer hose with a single rubber layer of said acrylic rubber composition.

11. The joining structure according to claim 1, wherein:
said heat-resistant hose is a multi-layer hose with an innermost layer of said acrylic rubber composition and a middle or outer layer of acrylic rubber or a rubber other than acrylic rubber.

12. The joining structure according to claim 1, wherein:
said heat-resistant hose having a reinforcement layer of reinforcement fiber or wires as a middle layer or outermost layer thereof.

13. The joining structure according to claim 1, wherein:
said heat-resistant hose is used in a high heat-resistant hose of an air system or oil system of an automobile.

14. The joining structure according to claim 13, wherein:
said air system or oil system high heat-resistant hose is a supercharger hose, an engine oil cooler hose, an automatic transmission oil cooler hose, or a power steering hose.

* * * * *